United States Patent
Posa

[11] Patent Number: 5,832,660
[45] Date of Patent: Nov. 10, 1998

[54] DECORATIVE PLANT COVER

[76] Inventor: John G. Posa, 1204 Harbrook Ave., Ann Arbor, Mich. 48103

[21] Appl. No.: 786,262

[22] Filed: Jan. 22, 1997

[51] Int. Cl.⁶ .................................................. A01G 13/02
[52] U.S. Cl. .............................................................. 47/28.1
[58] Field of Search ................................. 47/21, 26, 28.1, 47/30; 24/127, 712.9

[56] References Cited

U.S. PATENT DOCUMENTS

| 274,044 | 3/1883 | Smith | 24/127 |
|---|---|---|---|
| 1,155,239 | 9/1915 | Iasigi | 24/712.9 X |
| 4,265,049 | 5/1981 | Gorewitz | 47/26 |
| 4,646,467 | 3/1987 | Morrisroe | 47/21 |
| 4,969,555 | 11/1990 | Fitzgerald | 47/21 X |
| 5,347,750 | 9/1994 | Mills | 47/30 |
| 5,375,368 | 12/1994 | Motz | 47/30 |
| 5,479,741 | 1/1996 | Underwood | 47/30 |

FOREIGN PATENT DOCUMENTS

| 97853 | 5/1929 | Hungary | 47/30 |
|---|---|---|---|
| 585 | 12/1875 | Italy | 47/21 |
| 75309 | 7/1917 | Switzerland | 47/21 |
| 12645 | of 1890 | United Kingdom | 47/21 |
| 1904 | 4/1987 | WIPO | 47/30 |

Primary Examiner—John A. Ricci
Attorney, Agent, or Firm—Gifford, Krass, Groh, Sprinkle, Patmore, Anderson & Citkowski

[57] ABSTRACT

A protective plant covering comprises a sheet of flexible material having two opposing side edges, each with a plurality of fasteners, such that, with the material wrapped around the plant, the two side edges may be brought proximate to one another and adjustably fastened around the plant using the fasteners. In the preferred embodiment, fasteners in the form of strings and capture devices are vertically spaced apart along one or both of the side edges in a manner which allows the material to at least partially overlap upon itself for enhanced protection. One or more fasteners may also be provided along the upper and lower edges of the material, to enable top and/or bottom closure mechanisms, or the ganging together of separate sheets to create a more extensive covering for larger plant varieties or groupings. The outer surface of the material may include visual indicia in the form of decorative floral imagery, enabling the invention to be less conspicuous when installed.

20 Claims, 4 Drawing Sheets

DECORATIVE PLANT COVER

FIELD OF THE INVENTION

This invention relates generally to protective coverings for plants, bushes, shrubbery, and so forth during harsh or cold weather, and, more particularly, to an improved, more aesthetic covering which is more conformal to the shape of the plant to be protected, and one which is more easily stored during periods of non-use.

BACKGROUND OF THE INVENTION

During harsh or cold weather, it is a good practice to protect plants from the wind and the elements. Although some gardeners believe it is advantageous to "keep a plant warm," this is actually incorrect. In fact, if a plant is allowed to warm up at the wrong time, premature spring growth may occur, resulting in dieback in the event of a cold snap. Without protection, winter plant injury may be caused by severe cold or loss of moisture from shoots or branches. Although it is normal for plant moisture to slowly evaporate throughout the winter, during periods of bright winter sunshine, the effect of strong winds may accelerate this drying process to an unacceptable level.

Thus, is it best to protect plants from fluctuations in temperature, which may be accomplished through some form of wind-break. Two devices currently used for this purpose, burlap and Styrofoam "rose cones," both have drawbacks. Burlap is dirty, difficult to drape over plants without an additional supporting structure, and it eventually rots out. Also, its darker color may absorb solar energy and cause unwanted heating, particularly if wrapped too tightly.

The typical rose cone, shown in FIG. 1, is unattractive and non-recyclable. Although these units are designed to be stacked on top of one another, being rigid and non-collapsible, they consume a considerable amount of volume when stored. In addition, the cone or pyramid shape defined by the interior of such covers is not conformal to the shape of most plants, forcing users to prune the plant in an undesirable way just to fit the cover over the plant.

SUMMARY OF THE INVENTION

The present invention overcomes limitations of existing devices and techniques by providing a protective plant covering comprising a sheet of flexible material having two opposing side edges, each with a plurality of fasteners, such that, with the material wrapped around the plant, the two side edges may be brought proximate to one another and adjustably fastened around and in physical conformity with the plant using the fasteners.

In the preferred embodiment, a durable spun-bonded material is used in conjunction with fasteners in the form of strings and string-capture devices in the form of disks. Preferably, the fasteners are vertically spaced apart along one or both of the side edges in a way that allows the material to at least partially overlap upon itself for improved conformity with plant shape and enhanced wind protection. Also in the preferred embodiment, the outer surface of the material includes visual indicia in the form of decorative floral imagery, enabling the invention to be less conspicuous when installed.

In alternative embodiments, the wrapping may further include one or more fasteners along the upper edge of the material, enabling portions of the upper edge to be brought proximate to one another and fastened, for example, to create a closed top. One or more fasteners may also be associated with the lower edge, enabling the lower edge to be cinched together and/or anchored to one or more ground stakes or to the plant itself. The various fasteners may also be used to gang separate wrappings together to create a more extensive sheet for larger plant varieties or groupings. In a tree-wrapping application, the material may further include a pest-attracting and/or insect-capturing substance applied to the inner surface of the material, which is preferably exposed through the removal of a release layer.

DETAILED DESCRIPTION OF THE INVENTION

Figure 2:
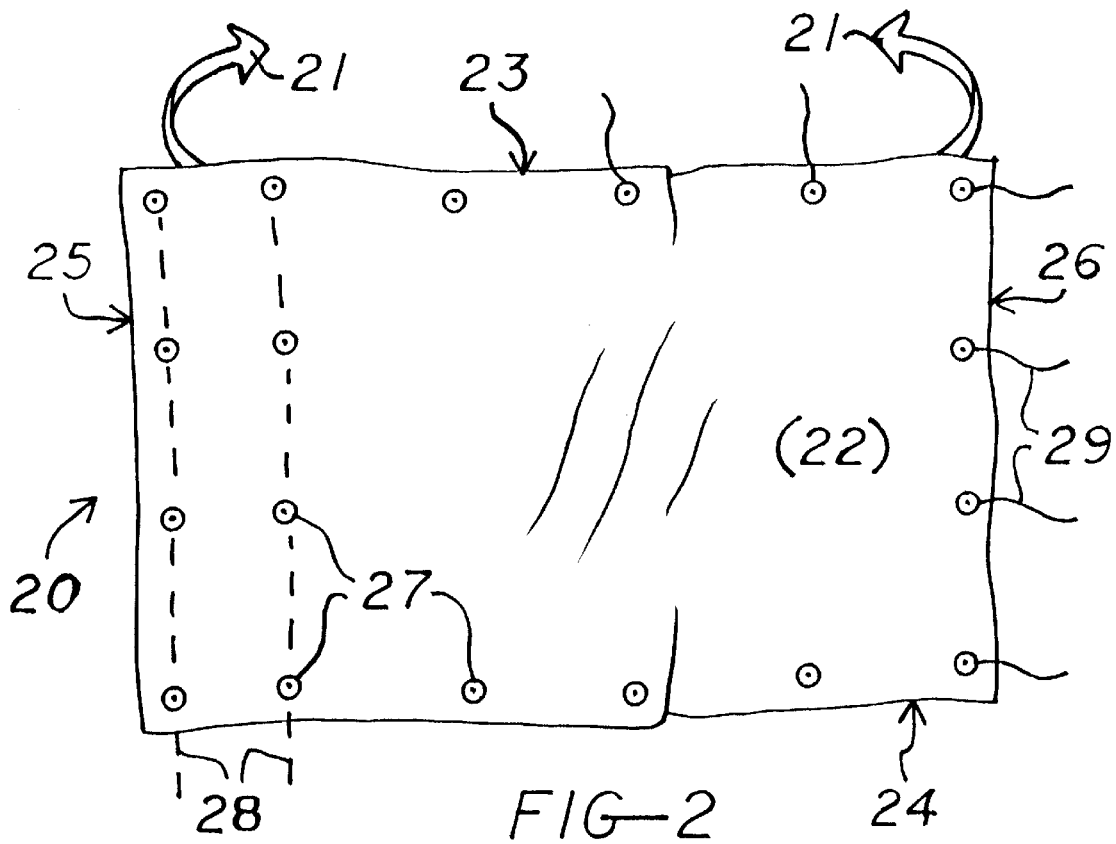
FIG. 2 is a drawing of a plant wrap according to the invention utilizing strings and string-capture devices in the form of capture disks.

Now making reference again to the drawings, FIG. 2 illustrates a plant wrap according to the invention indicated generally at 20 in unfolded form. Definitionally, the wrap 20 comprises a flexible sheet of material 22 having a top edge 23, a bottom edge 24, and two side edges 25 and 26, respectively. In a preferred embodiment, a plurality of fasteners 27 are provided around the entire periphery of the material 20, including one or more vertical rows of fasteners 28, enabling the edge 26 to overlap the edge 25 when the material is wrapped around the plant, as indicated by the larger arrows 21.

Figure 5A:
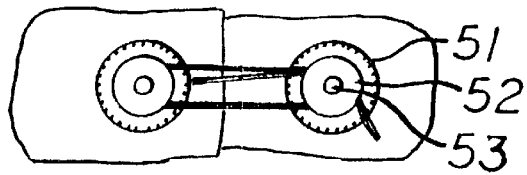
FIGS. 5A to 5P illustrate a variety of fasteners according to this invention.

In the preferred embodiment, the fasteners take the form of string and string-capture devices such as the disks shown in FIG. 5A, in which case strings 29 are provided in association with at least a subset of the fasteners 27. Such strings 29 may either be wrapped around the capture-disk by a user of the invention during installation, in which case the strings may be provided in loose form, or, alternatively, knowing that certain of the fasteners will require a string for use, one end of each string may be affixed in place along with, or under, an appropriate set of fasteners, as shown in FIG. 2.

Figure 3:
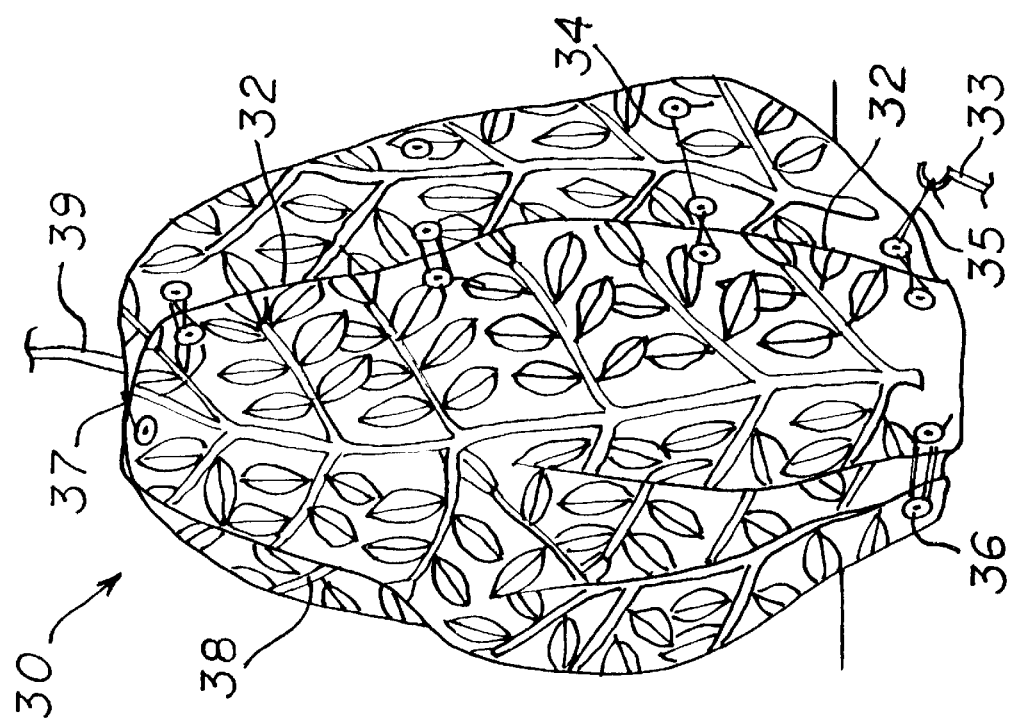
FIG. 3 is a drawing of a plant covering according to the invention installed on a plant to be protected and having decorative floral visual indicia imprinted on an outer surface.

FIG. 3 illustrates a covering according to the invention now installed onto a plant to be protected. Some advantages of the covering, shown generally at 30, are evident when the material is in place. In practice, during the installation process, the fasteners may first be used to close the bottom portion of the material, then, with the edge 32 overlapping onto the outer surface of the material itself, to close the fasteners in bottom-up fashion until the top is reached. Conveniently, any loose strings resulting from the closure process may simply be wound onto any available string-capture device nearby, as evident through the use of string 34.

When the top of the material has been reached, the fasteners associated with the upper edge 23 in FIG. 2, may be closed upon themselves, if so provided, to create an enclosed wrap around the entire plant. Again, it is not necessary that strings be attached to any particular capture device, but rather, side and top fasteners, for example, may be intermixed so as to better conform to the physical shape of the plant.

Note that if fasteners are associated with the lower edge of the material, they may be used to "cinch-up" the bottom edge of the material, as depicted with fasteners 36, or, an available string 35 may be attached to the plant itself or used in conjunction with a ground stake 33, if so desired. Among other advantages of the invention are that, in contrast to existing rigid devices, mulch may be easily added, particularly if the wrapping is secured around the bottom and worked upwardly, in which case the mulching material can simply continue to be packed in and around the plant, until the top edge is either closed or left open, at the user's option. Additionally, portions of the plant being protected may protrude through the covering of the invention, if the user chooses to have such features remain exposed instead of pruning them off. As one example, a cane 39 of a climbing rose may simply be left on a trellis without having to trim it off. For that matter, the wrap according to the invention may be placed around the trellis itself, thereby eliminating the need to disturb plants in their growing environment.

Figure 1:
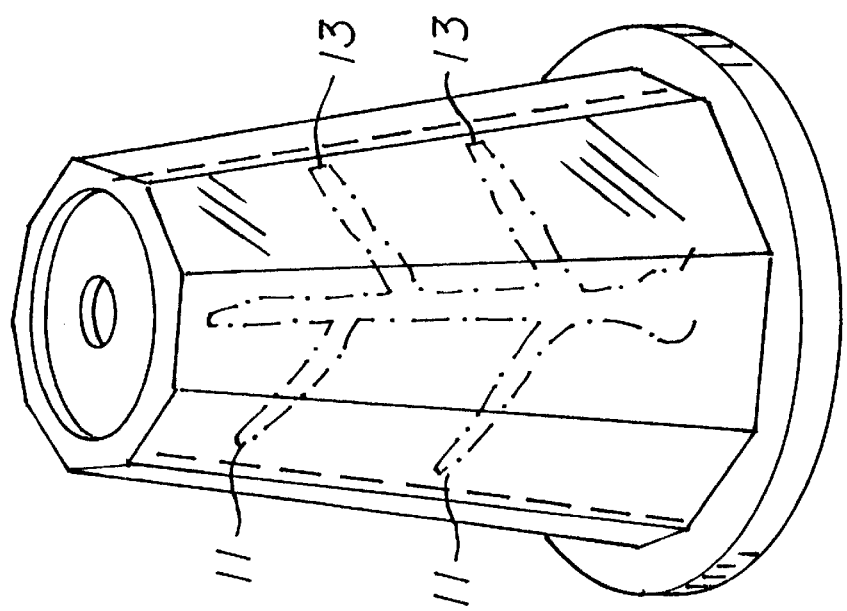
FIG. 1 illustrates, from an oblique perspective, a prior-art rose cone of the type which is ordinarily constructed of Styrofoam.

FIG. 3 also illustrates that, in a preferred embodiment, to make the wrapping more aesthetically pleasing, visual indicia 38 are preferably applied to the outer, exposed surface of the wrap such that when it is positioned around a plant to be protected, thus giving the appearance of a live plant, in pleasing contrast to the stark white cone of FIG. 1. Such plant visual indicia may be representative of plants in various stages, including a green leafy appearance, dormant or semi-dormant, snow covered, and so forth, depending on market and/or climatic conditions. At least two sizes of the wrap will preferably be provided, a smaller size primarily for rose bushes, and a larger size for rhododendron, azaleas, holly, and other potentially larger bushes. Accordingly, the smaller size may preferably have rose-related visual indicia associated therewith, whereas the larger size may depict a rhododendron or evergreen, for example.

In terms of materials, the wrap is preferably composed of a spun-bonded polypropylene such as Style 3351 Typar® available from the Reemay Corporation of Old Hickory, Tennessee. This Typar material offers certain advantages, including a breathable nature, and the ability to make cuts in the material, if desired, for better conformity with a plant structure, without the risk of tearing, as there is no "grain" with spun-bonded materials of this type. In addition, in the event that silk-screening is used to apply the visual indicia, it has been found that, although the polypropylene does not withstand high oven temperatures for ink drying purposes, water-based and vinyl inks nevertheless penetrate entirely through the material, resulting in a very permanent design pattern.

In addition, as hot-melt glue is preferably utilized for fastener bonding, as discussed in further detail below, it has also been found that with the correct viscosity of glue in the liquid state, it also penetrates through the polypropylene fibers resulting in substantial adherence. The Style 3351 and certain other colors of Typar® are also somewhat reflective in nature, which can assist in blocking solar energy that could otherwise be responsible for overwarming. It should be apparent that various other materials, both organic and inorganic, may be substituted for the spun-bonded polypropylene, yet function equally well according to the invention. In particular, recycled plastics of different compositions may be used, and, in place of silk screening the outer design, different colors of plastic may simply be melted together to create floral imagery, for example.

Figure 4:
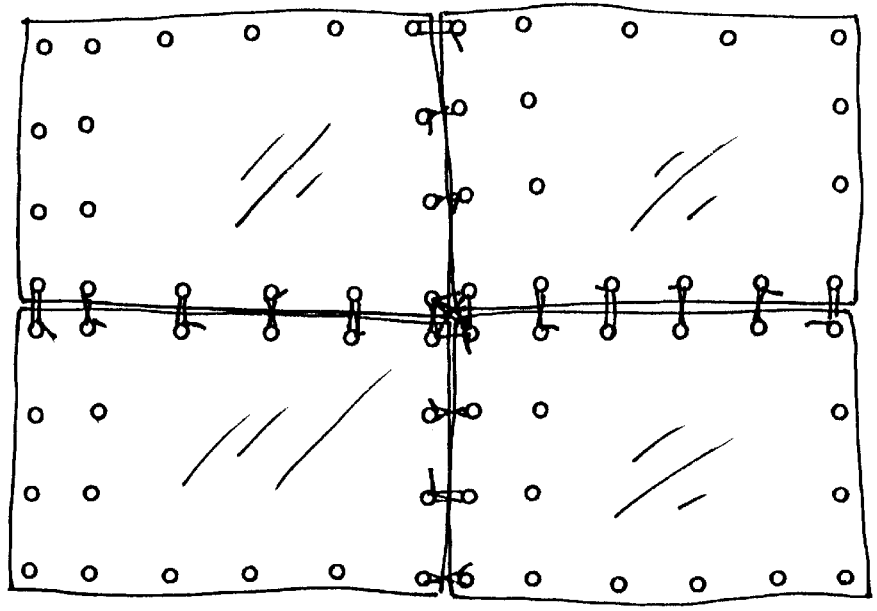
FIG. 4 is a drawing which shows how a plurality of material sheets according to the invention may be interconnected to provide for a larger covering.

Now turning to FIG. 4, an advantage of having fasteners optionally disposed around the entire perimeter of the material, is that such an arrangement allows multiple sheets to be joined along their edges, both horizontally and vertically, to accommodate larger plants or groupings of plants. For example, multiple sheets may be joined vertically to surround tall, narrow evergreens such as climbing roses, arbor vitae, and the like, or, the sheets may be joined horizontally, to accommodate plants with larger girths such as certain types of spruce, quince, and so forth. As shown in FIG. 4, a plurality of sheets may be joined both horizontally and vertically for even larger plant types, including tree trunks.

Figure 5I:
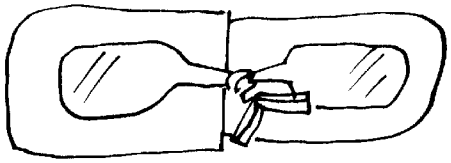
Figure 5B:
Figure 5J:
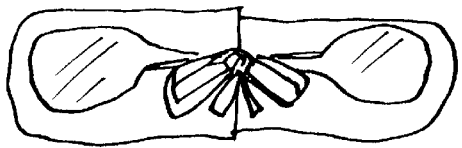
Figure 5C:
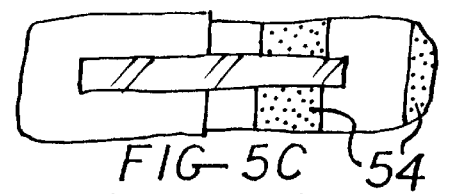
Figure 5K:
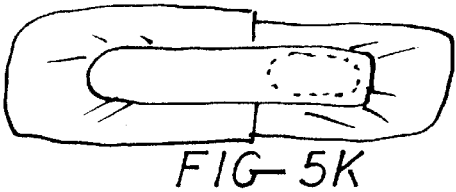
Figure 5D:
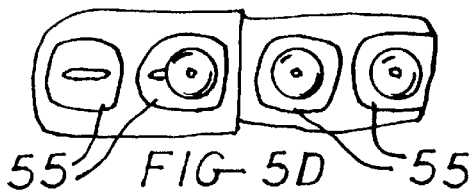
Figure 5L:
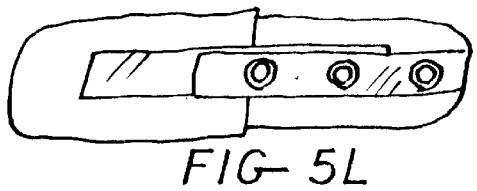
Figure 5E:
Figure 5M:
Figure 5F:
Figure 5N:
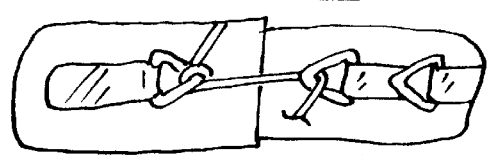
Figure 5G:
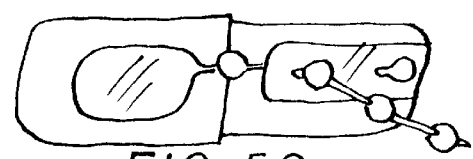
Figure 5O:
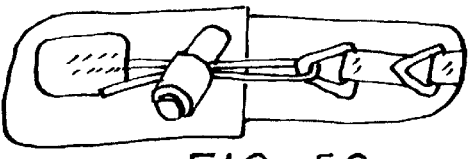
Figure 5H:
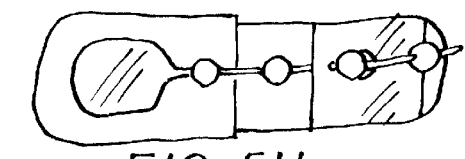
Figure 5P:

FIGS. 5A to 5P illustrate various alternative fasteners which may be used according to the invention, with the understanding that other fastener types are also applicable. FIG. 5A, however, illustrates the preferred mechanism, which uses a string and one or more capture devices, preferably in the form of a two-part disk. One portion of each disk, 51, is bonded or adhered to the outer surface of the wrapping material, whereas a second portion 52 is preferably attached to the first portion 51 through the use of a rivet 53. Various materials may be used for the string-capture device, such as vinyl or other plastics, and the rivet may also be plastic, or metal or other suitable alternatives.

The string-capture structure consisting of elements 51, 52 and 53 may be made as a unit and glued onto the outer surface of the wrapping material, with the portion 51 preferably including a number of small apertures, around its periphery, for example, enabling the adhesive, such as hot-melt glue, to seep through and provide a better bond. Alternatively, an additional disk may be placed on the inner side of the material, with the rivet 53 being applied through the entire stack of elements, so as to bind the resulting structure on both sides of the wrap for a strong attachment. Various other bonding mechanisms may be used, with the general principle being that, in the preferred embodiment, the fasteners may undergo quite a bit of use without compromising their structural integrity. As mentioned earlier, the string used in conjunction with the capture devices may either be provide separately, in which case it will be wound around two or more of the capture devices to provide closure or, alternatively, the strings may be made available through a separate attachment to the material itself. That is, without necessarily using a capture device as the point where the string actually attaches to the material.

FIGS. 5B and 5C illustrate hook-and-loop or Velcro-type material in use as a closure mechanism, noting that at least one aspect (54) may be provided in a vertical manner as opposed to a horizontal stripe. FIG. 5D shows how buttons may be used. As with the string-capture devices of FIG. 5A, reinforcement areas 55 are preferably used to ensure that the buttons do not pull off or that the slots do not readily tear. FIGS. 5E and 5F illustrate the use of plastic barb-type connector mechanisms, whereas FIGS. 5G and 5H illustrate the use of ball-capture-type devices. FIG. 5I shows how coated metal wires or "twister ties" may be used, whereas FIG. 5J shows how strings, without capture devices, may alternatively be employed.

In the event that the invention is intended to be discarded after use, permanent, as well as temporary closure devices may be used, including adhesive tape, as shown in FIG. 5K. In FIG. 5L, plastic snaps are used to adjustably close the material around the plant to be protected. FIG. 5M shows the use of a buckle; FIG. 5N shows the use of a string and eyelets; FIG. 5O shows the eyelets in use with a spring-loaded type of manually adjustable capture device; and FIG. 5P illustrates how slits and pegs may alternatively be utilized.

Figure 6A:
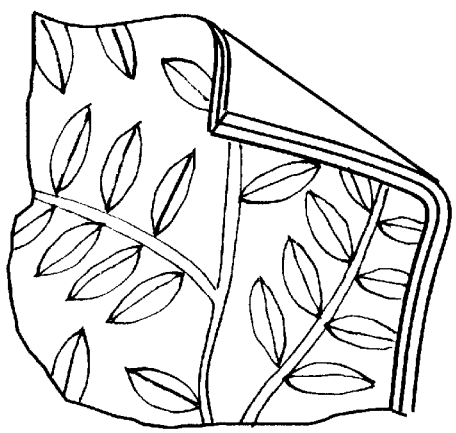
FIGS. 6A to 6D illustrate different multi-play material constructions according to the invention, including structures with and without air gaps, quilting, and a foam insulating layer.
Figure 6B:
Figure 6C:
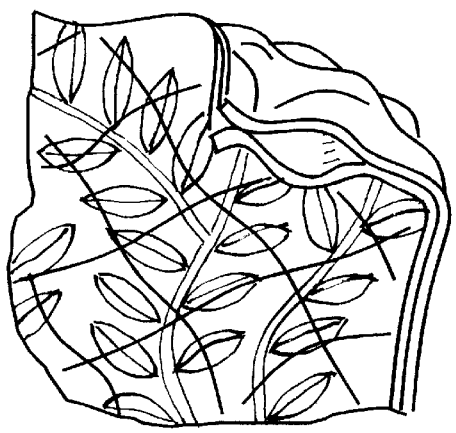
Figure 6D:
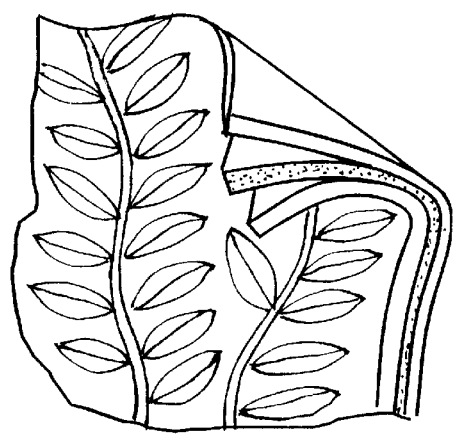

Although the wrap may be constructed of single-ply material, multiple plies may alternatively be employed with or without an air gap (FIGS. 6B and 6A, respectively) to create a more insulating barrier. Specifically, two or more plies of may be quilted together, as shown in FIG. 6C, with the internal pockets formed thereby being left unfilled, that is containing only air. Indeed, in one embodiment of the invention certain types of commercially available bubble-wrap materials may be used. As an alternative to air-filled pockets, a second, insulating layer may be bonded to a decorative outer material, as illustrated in FIG. 6D. For example, a layer of closed- or open-cell foam may be bonded to one or more outer layers, either continuously or with heat welding being used to create a quilted pattern, if desired. In a tree-wrapping application, the material may further include a pest-attracting and/or insect-capturing substance applied to the inside surface of the wrapping material, this substance being preferably exposed through the removal of a release layer.

That which is claimed is:

1. A protective wrapping for a plant having a base and a girth defining a shape, the protective wrapping comprising:

a sheet of flexible material having an inner and an outer surface, upper and lower edges defining a heights and two opposing side edges defining a width, the width being sufficiently dimensioned to permit the material to be wrapped around the girth of the plant, and the material being cloth-like and readily conformable to the approximate shape of the plant being protected, with the outer surface of the material including a decorative floral pattern; and a plurality of removable fasteners, provided separately from the material, enabling the material to be wrapped around the plant, with the two side edges brought proximate to one another and adjustably fastened around the girth of the plant using the fasteners where the edge overlap in an arrangement according to the shape of the plant.

2. The protective wrapping of claim 1, further including one or more fasteners associated with the upper edge, enabling portions of the upper edge to be brought proximate to one another and fastened so as to create a closed top.

3. The protective wrapping of claim 1, further including one or more fasteners associated with the lower edge of the material, enabling the lower edge to be cinched around the base of the plant.

4. The protective wrapping of claim 1, wherein the outer surface includes areas which are at least partially reflective.

5. The protective wrapping of claim 1, wherein the fasteners pierce the two side edges of the material upon installation.

6. The protective wrapping of claim 1, wherein the sheet of flexible material is breathable.

7. The protective wrapping of claim 1, wherein the sheet of flexible material is non-woven.

8. The protective wrapping of claim 1, wherein the sheet of non-woven material is spun-bonded.

9. A protective wrapping for plants, comprising:

a sheet of flexible material having an inner surface and an outer surface, upper and lower edges defining a height, and two opposing side edges defining a width, the width being sufficiently dimensioned to enable the material to be wrapped around the girth of a plant to be protected, and with the inner surface of the material including a pesticide layer; and a plurality of fasteners associated with the two side edges, such that, with the material wrapped around the plant, the two side edges may be brought proximate to one another and adjustably fastened around the plant using the fasteners.

10. The protective wrapping of claim 9, wherein material is multi-ply.

11. The protective wrapping of claim 10, wherein the multiple plies are adhered to one another without an airgap therebetween.

12. The protective wrapping of claim 10, wherein the multiple plies are adhered to one another with an airgap therebetween.

13. The protective wrapping of claim 12, wherein the multiple plies are quilted to one another so as to create the airgap therebetween.

14. The protective wrapping of claim 10, wherein at least one of the plies is a layer of foam.

15. A method of protecting a plant in a decorative manner, comprising the steps of:

providing a flexible sheet of material having a top edge, a bottom edge, two opposing sides edges, and inner and outer surfaces, the material being substantially cloth-like and readily conformable to the approximate shape of the plant being protected;

imprinting a floral design on the outer surface of the material;

providing a plurality of removable fasteners, physically separate from the material;

wrapping the sheet of material around the plant to be protected, such that the two side edges overlap with one another at various points as the material being wrapped assumes the shape of the plant; and fastening the two side edges of the material together at the different points of overlap using one or more of the fasteners so that the material retains an approximation of the shape of the plant.

16. The method of claim 15, further including the steps of:

continuing to overlap additional edges of the material; and securing each overlap with one or more of the fasteners until the material fits snugly around the plant.

17. The method of claim 15, further including the step of overlapping and fastening two portions of the top edge using one or more of the fasteners.

18. The method of claim 15, further including the step of overlapping and fastening two portions of the bottom edge using one or more of the fasteners.

19. The method of claim 15, wherein the step of providing a flexible sheet of material includes the step of providing a non-woven sheet.

20. The method of claim 15, wherein the step of fastening the two side edges of the material includes piercing both edges of the material with the fastener.

* * * * *